United States Patent [19]

Buchele et al.

[11] 4,177,723
[45] Dec. 11, 1979

[54] COMPACTOR DEVICE FOR LARGE ROUND BALES

[75] Inventors: Wesley F. Buchele, Ames; Dennis L. Jeffries, Waterloo; Ricky D. Madson, Ames; Timothy J. Mattson, Waterloo; Gregory E. Sparks, Waterloo; Raymond D. Thompson, Waterloo; Howard T. Uehle, Waterloo, all of Iowa

[73] Assignee: Iowa State University Research Foundation, Inc., Ames, Iowa

[21] Appl. No.: 876,055

[22] Filed: Feb. 8, 1978

[51] Int. Cl.² .................... B65B 13/20; B30B 9/30
[52] U.S. Cl. ........................................ 100/8; 100/3; 100/245; 100/255; 100/272; 100/295
[58] Field of Search ............. 100/270, 271, 272, 215, 100/245, 255, 240, 3, 286, 287, 8, 295; 74/520; 254/122, 126, 9 R, 9 B, 9 C

[56] References Cited

U.S. PATENT DOCUMENTS

| 154,453 | 8/1874 | Byrne | 100/287 |
|---|---|---|---|
| 228,515 | 6/1880 | Cook | 100/255 X |
| 1,125,451 | 1/1915 | Bottomley | 100/255 X |
| 1,418,441 | 6/1922 | Howcott | 100/252 X |
| 1,526,767 | 2/1925 | Benjamins | 254/126 |
| 3,228,166 | 1/1966 | Thiele | 100/3 X |
| 3,245,122 | 4/1966 | Maurer | 100/272 X |

*Primary Examiner*—Billy J. Wilhite
*Attorney, Agent, or Firm*—Zarley, McKee, Thomte, Voorhees & Sease

[57] ABSTRACT

A compactor device for large round bales is disclosed comprising a horizontally disposed cylindrical housing containing a plunger, a double toggle mechanism connected to the plunger, a hydraulic cylinder connected to the double toggle mechanism for driving the plunger, and a stabilizer linkage connected to the plunger and the double toggle mechanism for maintaining the plunger in a vertical position during compaction of a bale.

4 Claims, 8 Drawing Figures

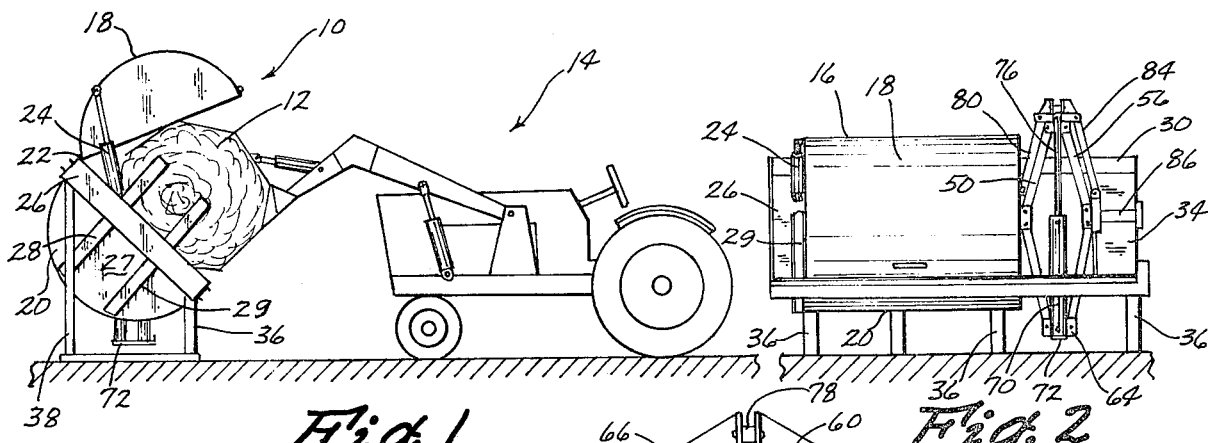
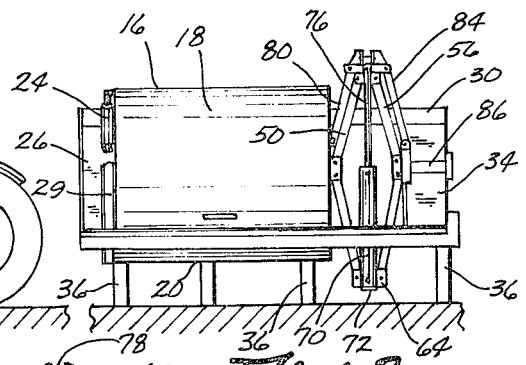
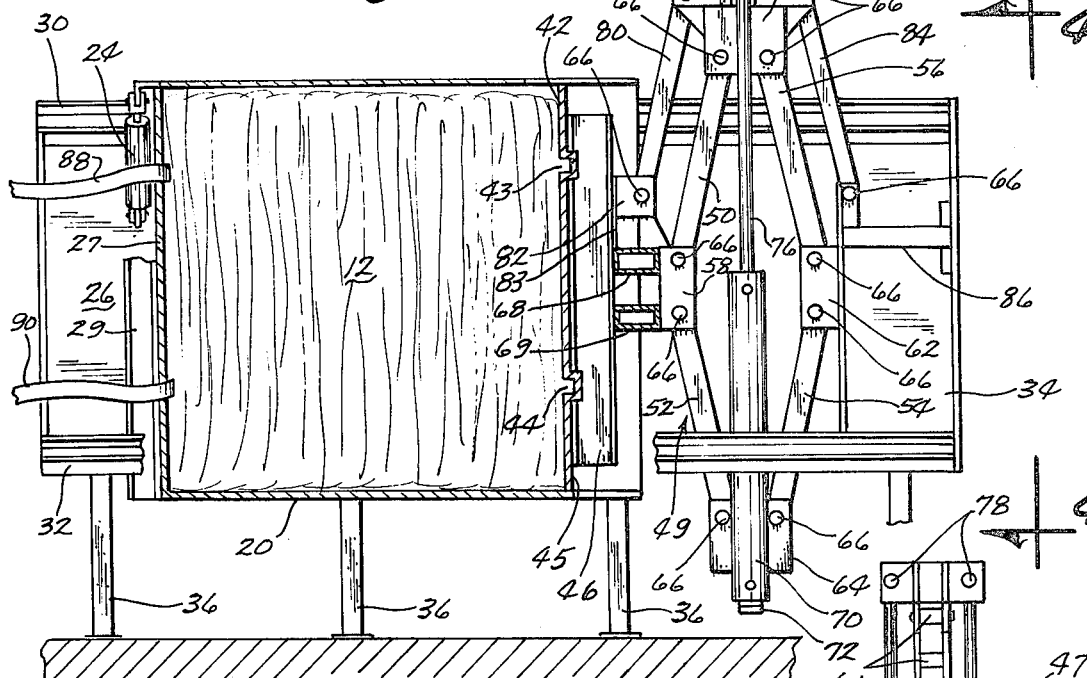
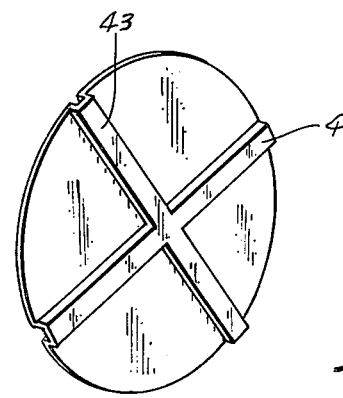
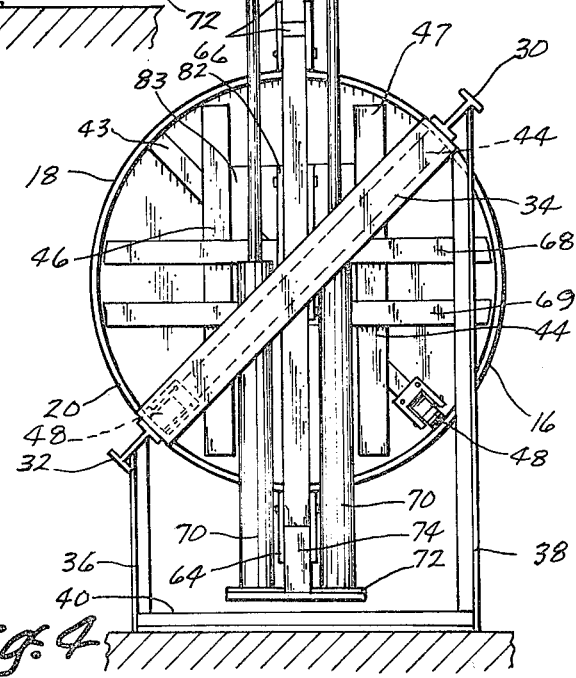

COMPACTOR DEVICE FOR LARGE ROUND BALES

BACKGROUND OF THE INVENTION

This invention relates to a compactor device and more particularly to a compactor device for large round bales.

With the increasing use of large round balers, the transportation of large bales has become a major problem as it is both impractical and uneconomical to transport them over long distances. An inverse relationship exists between the bulk density of a material and its economic hauling distance. For long distances, fee schedules are based on weight and density with a correction factor being used when low density cargos do not utilize the weight carrying capabilities of the transporting vehicles. Large round bales are approximately one-third as dense as the mean cargo density utilized by most motor carriers; therefore, they must pay a correction factor when transported long distances. Prior devices did not provide a practical, simple and economical means for compaction of large round bales to an optimum density for long distance transportation.

Another problem associated with compaction devices is that a compressed bale will not stay compressed after the compression force is removed. Accordingly, it is necessary that a bale be banded or otherwise secured in its compressed state. Although bands may be inserted along the stationary sides of the compactor device prior to the insertion of a bale, it remains a problem to insert the bands between the plunger and compacted bale before removal of the bale from the device.

SUMMARY OF THE INVENTION

A compactor device for large round bales is disclosed comprising a horizontally disposed cylindrical housing having a plunger therein, a hydraulic cylinder to power the plunger through a double toggle mechanism, and stabilizer linkage connected to the plunger and the double toggle mechanism to maintain the plunger in a vertical position during compaction of the large round bales. The top portion of the cylindrical housing pivots upward to allow easy access and placement of a large round bale within the housing. The double toggle mechanism produces increasing force on the plunger as the size of the bale decreases during compaction and the stabilizer linkage maintains the plunger in a vertical position throughout the compression cycle, irrespective of any force differential which may exist between the bottom and top portions of the plunger due to the non-uniform density of the bales. Transverse channels are formed across the plunger facing a bale to accommodate the insertion of banding material between the plunger and a compacted bale.

It is a principal object of this invention to provide a compactor device to compress large round bales to an optimum density for economical transportation over large distances.

A further object of the invention is to provide an improved compactor device for large round bales.

A still further object of the invention is to provide a compactor device for large round bales that exerts uniform increasing pressure during compaction on a bale of non-uniform density.

A still further object of the invention is to provide a compactor device which facilitates the banding of a bale in its compacted state.

A still further object of the invention is to provide a compactor device for large round bales that is economical to manufacture, durable in use, and simple in operation.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims and illustrated in the accompanying drawings in which:

FIG. 1 is a side view of the device being loaded or unloaded by a front end loader;

FIG. 2 is a front elevation view of the device;

FIG. 3 is an enlarged partially sectional view of the device in a loaded pre-operational position;

FIG. 4 is a side view as seen on line 4—4 of FIG. 3;

FIG. 6 is an enlarged detail view of the plunger of the device showing the transverse band receiving channels;

FIG. 7 is an enlarged detail section view of a plunger channel having a band extended therethrough.

DESCRIPTION OF THE PREFERRED EMBODIMENT

Figure 5:
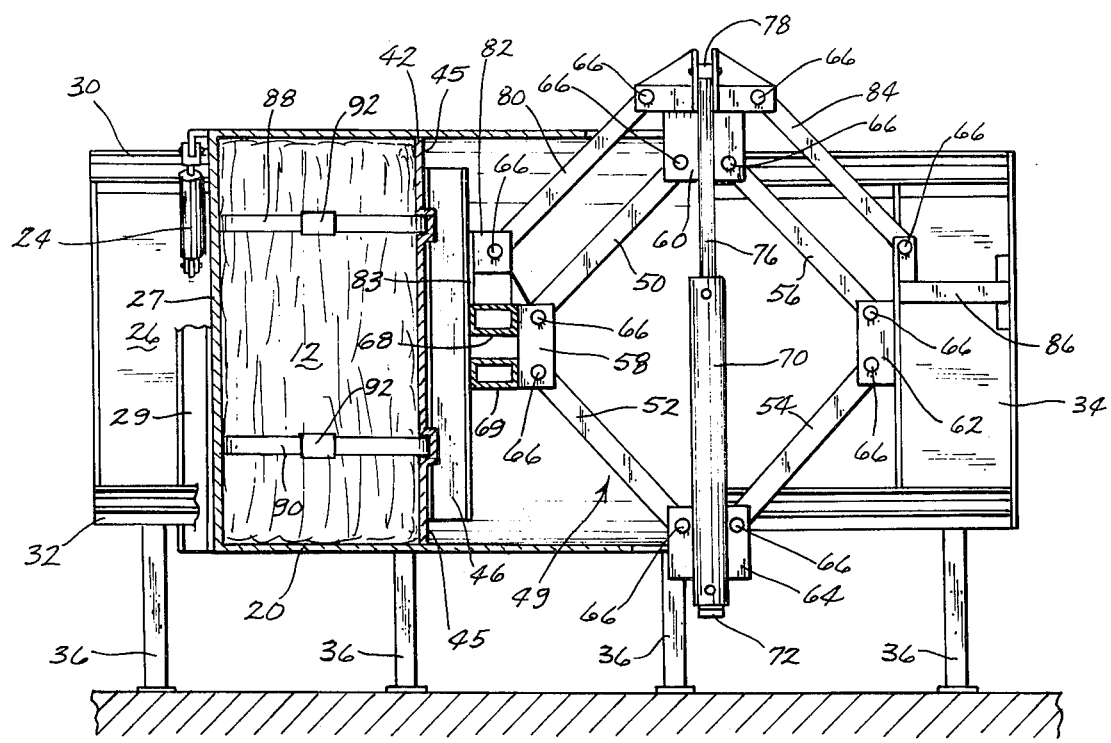
FIG. 5 is an enlarged partially sectional view similar to FIG. 3 with the device in a compressed position.
Figure 8:
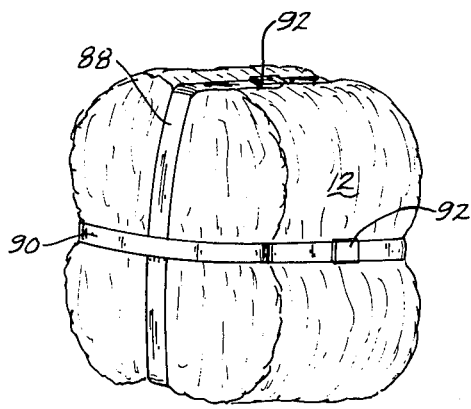
FIG. 8 is a perspective view of a banded compacted bale after removal from the device.

The numeral 10 refers to the compactor device of this invention shown in FIG. 1 with a bale 12 being loaded or unloaded by front end loader 14.

Compactor device 10 is comprised of cylindrical housing 16 longitudinally divided into upper portion 18 pivotally connected to lower portion 20 by hinge 22 as shown in FIG. 1. Upper portion 18 pivots upwardly from the closed position of FIG. 2 to the open position of FIG. 1 to provide access to the interior of cylindrical housing 16. Hydraulic cylinder 24 attached at one end to upper portion 18 and at the other end to lower portion 20 provides the force to pivot upper portion 18. I-beam 26 is securely attached to the outer side of the fixed end 27 of cylindrical housing 16 to provide strength thereto. A pair of additional I-beam braces 28 and 29 are arranged in spaced apart relation across the fixed end 27 at an angle to I-beam 26 so as to reinforce the ends of both the upper portion 18 and lower portion 20. Upper transverse I-beam 30 and lower transverse I-beam 32 are securely attached to I-beam 26 and run longitudinally along cylindrical housing 16 for connection to I-beam 34, as shown in FIG. 3. Front legs 36 secured to lower beam 32 and rear legs 38 secured to upper beam 30 supportably maintain compactor device 10 in an elevated horizontal disposition. Ground engaging support beam 40 runs between front leg 36 and rear leg 38 (FIG. 4) to provide added stability.

Plunger element 42 is vertically disposed within cylindrical housing 16 opposite to fixed end 27. As shown best in FIG. 6, a pair of band receiving channels 43 and 44 are formed in the plunger 42. The channels 43 and 44 extend transversely across the plunger 42 and are arranged perpendicular to one another. The channels protrude outwardly from the outer surface 45 so as to open toward a bale 12 for receiving banding material as will be further described hereinbelow. A pair of vertically disposed I-beams 46 and 47 (FIGS. 3 and 4) are securely attached to the outer surface 45 of plunger 42 to strengthen the plunger. Appropriate cutouts are provided in I-beams 46 and 47 for receiving the channels 43 and 44. A pair of plunger support wheels 48 (FIG. 4) are fastened to the lower ends of channels 43 and 44 to reduce friction as the plunger 42 is moved through cylindrical chamber 16.

Double toggle mechanism 49 is disposed between I-beams 46 and 47 and I-beam 34 and comprises arms 50 and 52 disposed in a pivotal parallel relationship to arms 54 and 56, respectively. Arms 50 and 52 are pivotally connected at one end to plate 58 while arm 50 is pivotally connected at the other end to plate 60. Arms 56 and 54 are pivotally connected at one end to plate 62, while the other end of arm 56 is pivotally connected to plate 60. The other ends of arms 52 and 54 are pivotally connected to plate 64 (FIG. 5). Pivot pins 66 provide the pivotal connection between the aforementioned plates and arms. Pipe bushings (not shown) may be utilized at these pivotal connections to reduce wear. The fixed end of toggle mechanism 49, i.e., the plate 62, is securely attached to I-beam 34 while the movable end, i.e., plate 58, is securely attached to I-beams 46 and 47 by a pair of vertically spaced and horizontally extended square tubing members 68 and 69.

Hydraulic cylinders 70 provide the compaction force to plunger 42 through toggle mechanism 49. Cylinders 70 are vertically disposed with the bottom end securely attached to plate 72. Plate 74 (FIG. 4) is securely attached at one end to plate 72 and securely attached at the other end to plate 64 of the toggle mechanism 49 thereby securely connecting the bottom ends of cylinders 70 to plate 64 of toggle mechanism 49. Ram arms 76 of hydraulic cylinders 70 are secured at their upper ends to plate 60 by pins 78. Retraction of arms 76 exerts force on plunger 42 through toggle mechanism 49 causing plunger 42 to move towards the fixed end 27 of cylindrical housing 16 thereby compressing bale 12. Extension of arms 76 causes plunger 42 to move in the opposite direction away from fixed end 28.

Stabilizer link 80 is pivotally connected at one end by pivot pin 66 to plate 60 of toggle mechanism 49 and is pivotally connected at the other end to ear 82, such that link 80 is parallel to arm 50 at all times. Ear 82 is securely supported on I-beams 46 and 47 by a transverse mounting plate 83 (FIGS. 3 and 4). Stabilizer link 84 is pivotally connected at one end to plate 60 by pivot pin 66 and pivotally connected at the other end by pin 66 to support member 86, such that link 84 is parallel to arm 56 at all times. Support member 86 is securely attached to I-beam 34 (FIG. 5). Stabilizer links 80 and 84 maintain plunger 42 in a vertical disposition during the compaction operation regardless of the density variations throughout bale 12. It is to be understood that a second set of stabilizer links could be installed below arms 52 and 54 in symmetrical relation to stabilizer links 80 and 84.

In operation, hydraulic cylinder 24 is extended to upwardly pivot upper portion 18 to allow access to the inner chamber of cylindrical housing 16. A pair of elongated flexible bands 88 and 90 are then positioned within the lower portion 20 along the two stationary sides thereof in alignment with the channels 43 and 44 of plunger 42. It is to be understood that the ends of the bands closest to plunger 42 are extended outwardly of the lower housing portion 20 thrpough elongate slots so as to be accessible for insertion through channels 43 are following compaction. The bands may be removably supported within the lower portion 20 by any suitable means including tabs or slots (not shown) on lower portion 20. A large round bale of material such as corn or hay is then placed in cylindrical housing 16 by a front loader 14 as illustrated in FIG. 1. Hydraulic cylinder 24 is then retracted to enclose bale 12 by cylindrical housing 16 as shown in FIG. 2.

In compressing a bale, more force is needed at the end of the compression stroke than at the beginning as the relative density of the bale is increasing as the bale is compacted. The vertical disposition of hydraulic cylinders 70 in relation to toggle mechanism 49 operates to provide this necessary increase in force during the compacting stroke. As ram arms 76 are retracted into cylinders 70, plunger 42 moves toward fixed end 28 with increasing force, thereby compacting bale 12. FIG. 3 shows the device 10 at the beginning of the compaction stroke and FIG. 5 shows the end of the compaction stroke.

Because the density of a large round bale is not uniform, a non-uniform force will oppose the movement of plunger 42. Stabilizer links 80 and 84 maintain plunger 42 in a vertical position and prevent it from tipping one way or the other due to this non-uniform force resulting from the density variation. This allows the bale to be compacted into a uniform shape that greatly facilitates transportation and storage of the compacted bale.

Once the ram arms 76 are retracted to compact bale 12 into a bale of optimum density for transportation, hydraulic cylinder 24 is extended to allow access to the interior of cylindrical housing 16 and the end of each of the bands 88 and 90 adjacent plunger 42 is inserted through the associated slot therefor and channel 43 or 44 of plunger 42 and joined to its opposite end by a suitable fastener 92 to prevent the bales from going back to their original shape upon removal from the compactor 10. Arms 76 are extended to move plunger 42 away from the compacted and banded bale. The compacted banded bale is now of optimum density for transportation and may be easily removed and maneuvered by front end loader 14 as shown in FIG. 1. Thus, it can be seen that this device accomplishes at least all of its stated objectives.

What is claimed is:

1. A compactor device for large round bales, comprising,
   a bale compartment having first and second opposite ends and being adapted to receive a bale to be compacted, said first end being fixed to resist movement of the bale during compaction,
   a plunger means slidably mounted within said bale compartment for movement towards and away from said first end, said plunger means having a periphery adapted to substantially conform to the shape of said compartment,
   a frame means secured to said second end of said bale compartment,
   a double toggle means having two pairs of arms pivotally secured together and being adapted for expansion and contraction in a direction towards and away from, respectively, said first end of said bale compartment, said double toggle means having first and second opposite sides with said first side fixedly secured to said frame means and said second side secured to said plunger means for movement therewith, said second side being secured to said plunger means at a position generally centrally of the periphery thereof, power means connected to said double toggle means for expanding and contracting said double toggle means, a first stabilizer arm pivotally connected at one end to said double toggle means and pivotally connected at the other end to said frame means, and a second stabilizer arm pivotally connected at one end to said double toggle means and pivotally connected at the other end to said plunger means at a position spaced between said periphery and the securement to said second side of the double toggle means, said first and second stabilizer arms being disposed in parallel relation to one pair of said arms of said double toggle means to maintain said plunger means in a constant attitude while said double means is being expanded to compact a bale within said bale compartment.

2. A compactor device for large round bales, comprising, a bale compartment having first and second opposite ends and being adapted to receive a bale to be compacted, said first end being fixed to resist movement of the bale during compaction, a plunger means slidably mounted within said bale compartment for movement towards and away from said first end, a frame means secured to said second end of said bale compartment, a double toggle means having two pairs of arms pivotally secured together and being adapted for expansion and contraction in a direction towards and away from, respectively, said first end of said bale compartment, said double toggle means having first and second opposite sides with said first side fixedly secured to said frame means and said second side secured to said plunger means for movement therewith, power means connected to said double toggle means for expanding and contracting said double toggle means, a first stabilizer arm pivotally connected at one end to said double toggle means and pivotally connected at the other end to said frame means, and a second stabilizer arm pivotally connected at one end to said double toggle means and pivotally connected at the other end to said plunger means, said first and second stabilizer arms being disposed in parallel relation to one pair of said arms of said double toggle means to maintain said plunger means in a constant attitude while said double toggle means is being expanded to compact a bale within said bale compartment, said power means comprising a hydraulic cylinder pivotally connected at one end to the pivotal connection of one of said pair of arms, and pivotally connected at the other end to the pivotal connection of the other of said pair of arms, said hydraulic cylinder being parallel to said plunger means and said plunger means being parallel to said first end of said bale compartment.

3. The device of claim 2 wherein said plunger has a pair of channels extended thereacross, said channels intersecting one another at medial portions thereof and opening toward said first end for the insertion of a respective pair of band means therethrough between said plunger and a bale in said compartment to bind the bale in its compacted form.

4. The device of claim 1 wherein said bale compartment is cylindrical in shape with said first end being one of the bases of the cylinder, said cylindrical bale compartment being divided longitudinally into upper and lower portions, said upper portion pivotally connected to said lower portion so as to pivot upwardly to provide access to the interior of said cylindrical bale compartment.

* * * * *